United States Patent [19]

Margetts

[11] 4,455,827

[45] Jun. 26, 1984

[54] MASTER CYLINDER AND SERVO BOOSTER ASSEMBLIES FOR VEHICLE BRAKING SYSTEMS

[75] Inventor: Hugh G. Margetts, Leamington Spa, England

[73] Assignee: Lucas Industries Limited, Birmingham, England

[21] Appl. No.: 233,988

[22] Filed: Feb. 12, 1981

[30] Foreign Application Priority Data

Feb. 12, 1980 [GB] United Kingdom ............... 8004639

[51] Int. Cl.³ .............................................. B60T 13/00
[52] U.S. Cl. ................................. 60/547.1; 91/369 A; 92/99; 92/169; 403/290; 403/354
[58] Field of Search ................ 92/98 D, 99, 165 PR, 92/169; 91/369 A; 60/547 R; 403/290, 354

[56] References Cited

U.S. PATENT DOCUMENTS

| | | | |
|---|---|---|---|
| 3,656,413 | 4/1972 | Eggstein | 92/99 |
| 3,885,851 | 5/1975 | Bennett | 403/290 |
| 4,012,155 | 3/1977 | Morris | 403/290 |
| 4,256,016 | 3/1981 | Thomas | 91/369 A |
| 4,270,353 | 6/1981 | Thomas | 60/547 R |
| 4,307,570 | 12/1981 | Yardley | 60/547 R |
| 4,338,854 | 7/1982 | Margetts | 92/98 D |
| 4,347,779 | 9/1982 | Belart | 91/369 A |
| 4,353,287 | 10/1982 | Weiler | 91/369 A |

FOREIGN PATENT DOCUMENTS 2922299 12/1979 Fed. Rep. of Germany ... 91/369 A

Primary Examiner—Abraham Hershkovitz
Attorney, Agent, or Firm—Scrivener, Clarke, Scrivener and Johnson

[57] ABSTRACT

In a master cylinder and servo booster assembly for a vehicle braking system a mounting plate is connected to the rear end of a vacuum operated servo booster. A tubular extension integral with the mounting plate extends sealably through the movable wall of the booster substantially to relieve the booster housing of braking reaction forces. Circumferentially spaced axially extending slots divide the extension into axially extending arms which are secured to the master cylinder housing at their free ends by the engagement of a radially extending projection on the end of each arm with an annular recess in the outer surface of the rear end of the master cylinder housing. A sleeve integral with the front shell of the booster housing encircles the ends of the arms and holds the arm ends in interlocking engagement with the master cylinder housing. Alternatively, projections on the master cylinder housing and recesses on the ends of the arms may be provided to secure the arms to the master cylinder housing.

8 Claims, 3 Drawing Figures

MASTER CYLINDER AND SERVO BOOSTER ASSEMBLIES FOR VEHICLE BRAKING SYSTEMS

This invention relates to master cylinder and servo booster assemblies for vehicle braking systems, and is particularly concerned with the manner in which the master cylinder is connected to the servo booster.

In published patent application G.B. No. 2,009,871A are disclosed various servo boosters which incorporate at least one stationary force transmitting member which extends sealably through the movable wall of the booster for substantially relieving the booster housing of braking reaction forces. In most of the embodiments described the force transmitting means take the form of a pair of tie rods each of which is connected at its front end to a flange provided on the rear end of the master cylinder housing, to effect a connection between the master cylinder housing and the booster.

The present invention stems from attempts to reduce the cost and weight of the connection between the master cylinder housing and the force transmitting means of a booster.

According to the invention in a master cylinder and servo booster assembly for a vehicle braking system of the kind in which the housing of the master cylinder is connected to a stationary force transmitting means which extends sealably through the movable wall of the booster, the force transmitting means comprises a plurality of substantially axially extending arms which are circumferentially spaced from one another with respect to the axis of the master cylinder housing and which are each provided with a respective integral radially extending projection or recess which engages with a complementary recess or projection respectively provided on the master cylinder housing to secure the arms to the master cylinder housing.

The arms may constitute independent force transmitting members of said force transmitting means, but preferably the arms are defined by axially extending slots in a force transmitting tube which is substantially coaxial with the axis of the movable wall of the booster. Such a tubular force transmitting member is disclosed in published British Patent Application No. 2031086A, but in the constructions there described the front end of the tube is connected indirectly to the master cylinder housing by means of studs.

Preferably the arms are arranged to be sufficiently resiliently flexible that during assembly of the arms to the master cylinder housing, with the rear end of each arm held at a fixed radial distance from the axis of the master cylinder housing, the front end of each arm can be resiliently deflected in a radial direction to enable the master cylinder housing to be moved axially relative to the arms to bring each projection into register with its corresponding recess.

A retaining means is preferably provided to hold each projection operatively engaged with the corresponding recess.

The retaining means preferably comprises a respective abutment member which engages with the respective arm to prevent it from moving radially with respect to the master cylinder housing.

The abutment members are preferably constituted by portions of an abutment ring, which is conveniently in the form of a sleeve integral with the front housing wall of the booster.

The sleeve may extend forwardly from said front booster housing wall, but preferably it is a rearwardly directed sleeve, and the sleeve is sealed to the master cylinder housing by an annular seal located forwardly of said arm portions to seal the front chamber of the booster against atmosphere.

When the projection or recess on the master cylinder housing is a single annular formation, means is preferably provided to prevent turning of the master cylinder housing relative to the force transmitting means.

The invention will now be further described, by way of example only, with reference to the accompanying drawings in which.

Figure 1:
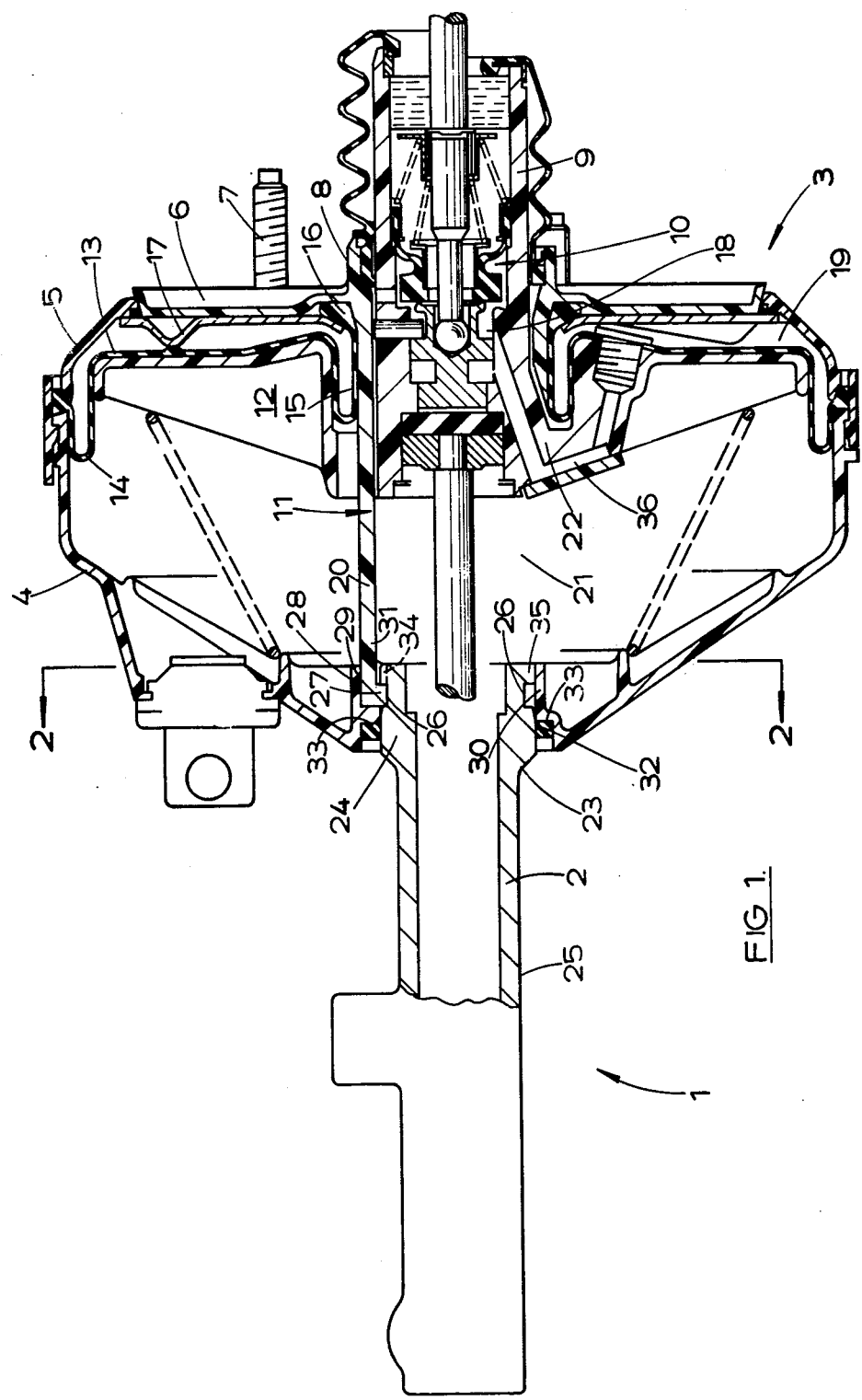
FIG. 1 is a longitudinal cross-sectional view of a master cylinder and booster assembly in accordance with the invention, but omitting the internal components of the master cylinder.
Figure 2:
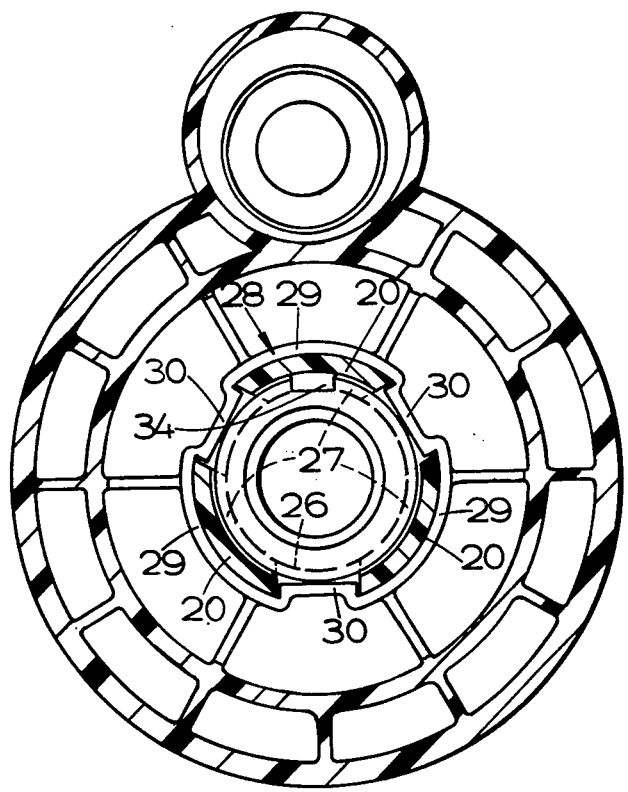
FIG. 2 is a section on the line 2—2 of FIG. 1.

With reference to FIGS. 1 and 2, the master cylinder and booster assembly comprises a master cylinder 1 having a cast and machined alloy housing 2 connected at its rear end to a vacuum-operated servo booster 3 of which the housing comprises a moulded plastics front shell 4 connected at its rear end to a frusto-conical, annular disc 5 which is connected at its rear end to the radially outer periphery of a circular mounting plate 6 through which extend studs 7 for connection to a vehicle bulkhead, the studs being carried by an annular retaining plate 17. The mounting plate 6 has an integral rearwardly directed first tubular extension 8 through which is slidably guided a cylindrical valve body 9 which houses a substantially conventional poppet valve assembly 10, and a forwardly directed tubular extension 11. An annular movable wall of the booster surrounds the tubular extension 11 and comprises a diaphragm support plate assembly 12 backed by a flexible diaphragm 13 having a first rolling diaphragm portion 14 which seals the radially outer periphery of the movable wall to the booster housing, and a second rolling diaphragm portion 15 which seals the radially inner periphery of the movable wall to the tubular extension 11 by means of a peripheral bead 16 held in place by the retaining plate 17.

Diaphragm support plate assembly 12 incorporates a passage 36 which provides permanent fluid communication between a valve chamber 18 of the valve housing 9 and the rear booster chamber 19, this feature being the subject of our published patent application G.B. No. 2036901A dated 21.11.79.

The tubular extension 11 is provided in the front two thirds of its length with three circumferentially equally spaced axially extending, radial slots 21 which divide that part of the extension 11 into three axially extending arms 20, and through each slot extends a respective radial web 22 which integrally connects the support plate assembly 12 to the valve body 9. The tubular extension may be formed as a thin steel pressing, from aluminium, as a die casting of MAZAK, or from a glass-filled NYLON for example.

The master cylinder housing 2 is of substantially constant external diameter for most of its length but comprises a rear end part 24 of enlarged external diameter connected by a step 23 to the constant-diameter part 25, and the end part 24 is machined with a radially outwardly facing annular recess 26 of oblong-rectangular cross-section which receives radially inwardly directed projections 27 of complementary cross-section, in a plane which includes the booster axis, integrally formed at the ends of the respective arms 20.

The tubular extension 11 is assembled to the master cylinder housing 2 by resiliently deflecting the front end of each arm 20 in a radially outward direction to enable the master cylinder housing 2 to be moved axially relative to the arms 20 to bring each projection 27 into register with the recess 26.

The projections 27 are retained in operative engagement with the recess 26 by arcuate first abutment portions 29 of a locking ring constituted by a rearwardly directed sleeve 28 integral with the booster housing shell 4.

The first abutment portions 29 are circumferentially equally spaced at a first radial distance from the axis of the booster 3. The sleeve 28 is completed by intermediate second abutment portions 30 which integrally interconnect the first abutment portions 29 and are each at a second radial distance from the booster axis which is smaller than said first radial distance. The first abutment portions 29 are arranged with their radially inner faces in engagement with the radially outer faces of the respective arm portions 31 to hold them against radially outward movement, and the second abutment portions 30 are arranged to fit in the slots 21 between the arms 20 to prevent rotation of the arms 20, tube 11 and plate 6 relative to the booster housing shell 4.

Shell 4 is sealed to the master cylinder housing 2 by an annular resilient seal 32 located within the front part of sleeve 28 and abutting a radially inwardly directed flange 33 of sleeve 28 which abuts the extremities of the arms 20 to prevent rearward axial movement of the central part of the housing shell 4 relative to the master cylinder housing 2.

The master cylinder housing 2 is prevented from turning relative to the booster by a radially inwardly directed peg 34 provided on the uppermost of the arms 20 adjacent to the projection 27, the peg 34 being received within a cut-out of complementary outline in a plane transverse to the booster axis provided in the flange 35 defined between recess 26 and the rear extremity of the master cylinder housing. The peg 34 could, alternatively, be formed on the sleeve 28 to engage in a recess formed in part 24 in front of the arm portions 31.

Figure 3:
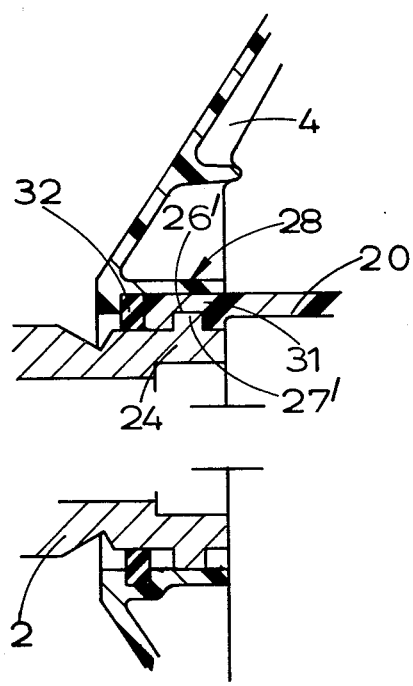
FIG. 3 is a longitudinal cross-sectional view, on a larger scale, of a modified coupling arrangement in accordance with the invention.

In the modification of FIG. 3 the radially outer surface of the rear end part 24 of the master cylinder housing is provided with a radially outwardly directed annular projection 27' which is received in a recess 26' in the respective arm end portions 31 which are made of increased radial thickness to accommodate the recesses 26'.

I claim:

1. A master cylinder and servo booster assembly for a vehicle braking system comprising a master cylinder housing positioned in front of a booster housing, a movable wall housed within said booster housing, a booster output rod connected with said movable wall and extending forwardly therefrom for operating said master cylinder, a stationary force transmitting tube co-axial with the axis of said output rod and extending through said movable wall, means sealing said movable wall to said tube, said tube comprising a front end adjacent to said master cylinder, said front end being provided with a plurality of rearwardly extending slots which are open at their front ends and between which are defined a plurality of forwardly directed arms of said tube, a front end portion of each arm, and a rear end portion of said master cylinder housing, one of said portions being provided with a projection directed radially of said axis, and the other of said portions being provided with a complementary radially directed recess in which said projection is received, whereby each arm is secured to said master cylinder housing for transmitting braking reaction forces from said master cylinder housing to said tube, a retaining means holding each said projection operatively engaged with the corresponding recess, and means holding said retaining means against movement relative to said booster housing, said arms being sufficiently resiliently flexible so that during assembly of said arms to said master cylinder housing, with the rear end of each said arm held at a fixed radial distance from said axis the front end of each said arm can be resiliently deflected in a radial direction to enable said master cylinder housing to be moved axially relative to said arms to being each said projection into registery with its corresponding recess.

2. A master cylinder and servo booster assembly as in claim 1 wherein said means holding said retaining means comprises an integral connection between said retaining means and said booster housing.

3. A master cylinder and servo booster assembly as in claim 1 comprising means preventing relative rotation between said master cylinder housing and said tube.

4. A master cylinder and servo booster assembly for a vehicle braking system comprising a master cylinder housing positioned in front of a booster housing, a movable wall housed within said booster housing, a booster output rod connected with said movable wall and extending forwardly therefrom for operating said master cylinder, a stationary force transmitting tube co-axial with the axis of said output rod and extending through said movable wall, means sealing said movable wall to said tube, said tube comprising a front end adjacent to said master cylinder, said front end being provided with a plurality of rearwardly extending slots which are open at their front ends and between which are defined a plurality of forwardly directed arms of said tube, a front end portion of each arm, and a rear end portion of said master cylinder housing, one of said portions being provided with a projection directed radially of said axis, and the other of said portions being provided with a complementary radially directed recess in which said projection is received, whereby each arm is secured to said master cylinder housing for transmitting braking reaction forces from said master cylinder housing to said tube, a retaining means holding each said projection operatively engaged with the corresponding recess, and means holding said retaining means against movement relative to said booster housing, said arm portion being located radially outside said housing portion, and a respective first abutment portion of said retaining means being located radially outside said arm portion and in engagement therewith whereby said first abutment portion retains said arm portion in operative engagement with said housing portion.

5. A master cylinder and booster assembly as in claim 4 comprising a locking ring of said retaining means, said first abutment portions being provided on said locking ring.

6. A master cylinder and servo booster assembly as in claim 5 wherein said booster housing comprises a front housing wall, said locking ring comprises a sleeve, and said means holding said retaining means comprises an integral connection between said sleeve and said front housing wall.

7. A master cylinder and servo booster assembly as in claim 6 comprising an annular seal located between said sleeve and said master cylinder housing forwardly of said arm portions for sealing the front chamber of the booster from atmosphere.

8. A master cylinder and servo booster assembly as in claim 6 wherein said first abutment portions are positioned at a first radial distance from said axis, and intermediate second abutment portions of said sleeve integrally interconnect said first abutment portions, said second abutment portions being positioned at a second radial distance from said axis which is smaller than said first radial distance, whereby said second abutment portions prevent relative rotation between said tube and said front housing wall.

* * * * *